Aug. 1, 1944.  W. KOHLHAGEN  2,354,954
MOTION CONTROLLING DEVICE
Filed May 21, 1942   3 Sheets-Sheet 1
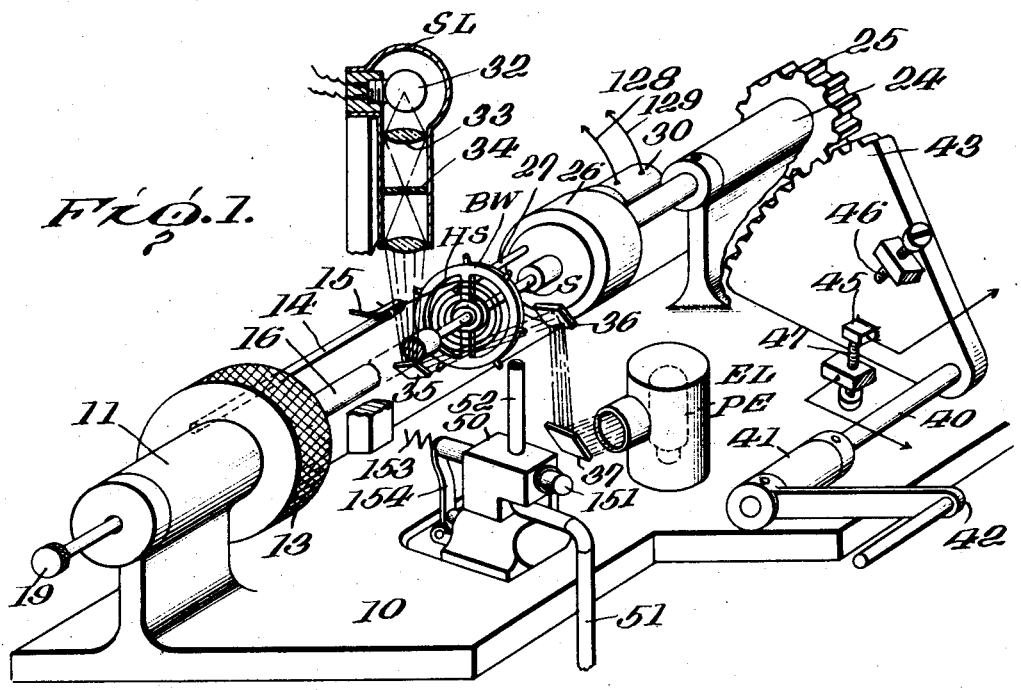
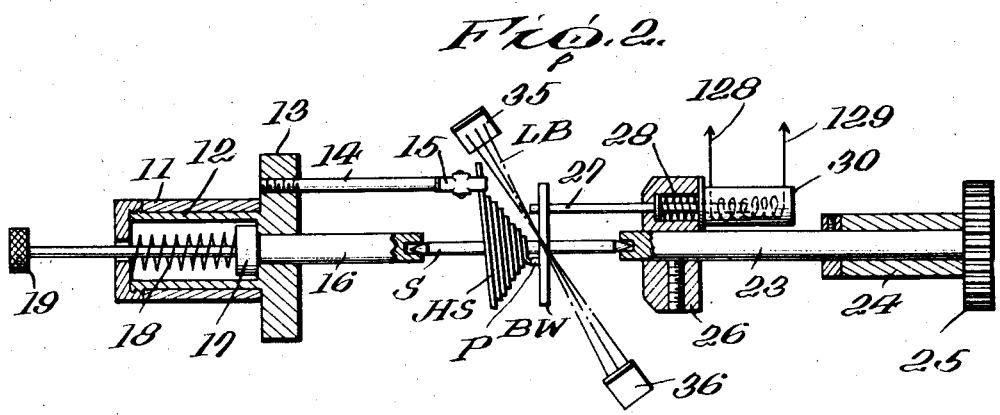
Inventor
Walter Kohlhagen,
By Mason, Porter & Diller,
Attorneys

FIG. 7.

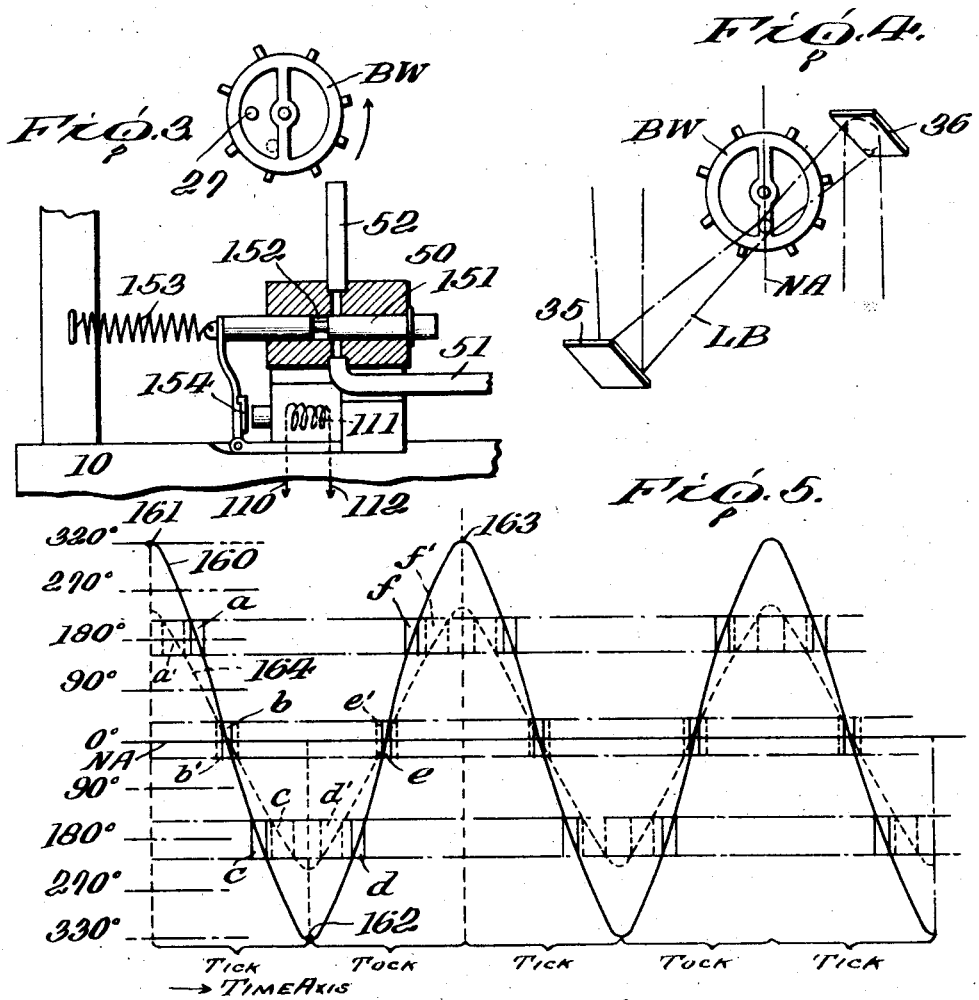

Patented Aug. 1, 1944

2,354,954

UNITED STATES PATENT OFFICE 2,354,954

MOTION CONTROLLING DEVICE

Walter Kohlhagen, Elgin, Ill., assignor to Elgin National Watch Company, Elgin, Ill., a corporation of Illinois Application May 21, 1942, Serial No. 443,997

13 Claims. (Cl. 250—41.5)

This invention relates to motion-controlling devices, and is concerned with methods and apparatus by which devices may be kept in constant oscillation at a substantially uniform amplitude of movement.

One of the features of the invention is the employment of means by which impulses of energy are delivered to the device at times and in amounts determined by the requirements of the device.

A feature of the invention is the employment of means by which the course of the normal oscillation of the device is scanned, and from the results of this scanning are derived times and values of impulses of energy which shall be supplied to the device for maintaining it in oscillation at its normal rate and at a substantially uniform amplitude.

A feature of the invention is the employment of means for scanning the device while in oscillation and thereby deriving a group of impulses for each oscillatory cycle, and discriminating between the impulses of the successive groups, and thereby determining the time intervals at which energy impulses are delivered for maintaining the device in oscillation.

A feature of the invention is the employment of means for scanning the device while in oscillation and thereby deriving a group of impulses for each oscillatory cycle, the impulses being variously spaced in accordance with the prevailing amplitude of oscillation, and employing the successive groups of impulses for determining the energy delivered for maintaining the device in oscillation.

A feature of the invention is the employment of means by which the device can be quickly and accurately positioned for oscillating and for assuring concord of the oscillation of the device with instrumentalities for delivering oscillation-maintaining energy thereto.

With these and other features as objects in view, as will appear in the course of the following description and claims and in the annexed drawings, an illustrative mode of practicing the invention is set forth on the drawings, in which:

Figure 1 is a general view of an embodiment of the invention with a perspective showing of certain mechanical structures.

Figure 1a is a conventionalized circuit diagram of electrical parts employed with the mechanical structure of Figure 1.

Figure 2 is a longitudinal axial view through a mechanical supporting structure utilized with a watch balance.

Figure 3 is a sectional view showing a control and air driving means for maintaining the oscillation of the balance.

Figure 4 is a diagrammatic view indicating the relation of the light beam to spokes of a balance wheel while quiescent at the neutral axis.

Figures 5, 6 and 7 are graphs illustrating the balance movement and the relative time positions of current impulses.

The invention is illustrated as employed for maintaining the amplitude of movement of a standard type of balance assembly which has two spokes and which oscillates through a total angle of 330 degrees in actual employment.

In Figure 1, a general frame is conventionally shown as supporting member 10 having structures for supporting the several mechanical parts in proper relationship to one another, and for permitting their required relative movements. A bearing 11 supports a hollow flange 12 of a disk 13 which has an eccentrically extending pin 14 provided at its end with pincers 15 for engaging the end of the hair spring HS of a balance illustrated as having the usual pin P, the balance wheel BW, and the staff S. One end of this staff (at the left in Figures 1 and 2) is rotatably received in an appropriate cavity in the end of a supporting member 16 which extends coaxially through the disk 13 and is provided with a collar 17 which limits its movement toward the right in Figure 2 under the urgency of a spring 18. The supporting member 16 is provided at its end with a knob 19 by which the operator may retract the same for engaging or releasing a balance.

The other end of the balance is similarly received in a cavity at the end of the supporting member 23 which is rotatably mounted in a bearing 24 and is provided at its opposite end with a pinion 25. Adjacent the balance, the supporting member 23 carries a disk 26 which is secured to turn with the member 23 and is provided with a slidable plunger 27 which is mounted eccentrically to the common axis of the supporting members 16, 23 at a proper distance for entering one of the spaces in the balance wheel BW (Figure 3), so that it can engage with one of the spokes thereof. The plunger 27 is retracted (toward the right in Figure 1) by the action of a solenoid 30 illustrated as mounted upon the disk 26, and is projected by a spring 28.

As shown in Figure 1, a source of illumination SL includes an electric lamp 32 and a lens system 33, with an enclosing housing to prevent escape of light except through a diaphragm 34.

Mirrors 35, 36, 37 serve to deflect the light so that it passes through the balance wheel BW at a point between its hub and rim, whereby this light beam is interrupted each time a spoke of the balance wheel BW cuts across its path. The light beam from the source SL is thus guided and controlled, and enters the housing EL containing a photoelectric cell PE, and energizes this cell selectively in accordance with its own control by the action of the spokes of the balance wheel BW.

A shaft 40 is supported on the base 10 by a bearing 41 and has a crank 42 by which it may be rocked. The shaft supports a sector rack 43 having teeth engaged with the pinion 25 so that the supporting member 23 can be turned through an angle by actuating the crank 42. An electrical contact 45 is illustrated as carried by the sector arm 43 for selective engagement at the limits of its rocking movement with contacts 46, 47, which are insulatedly mounted on the general frame 10. The contacts 46, 47 are illustrated as adjustable screw elements so that their effective positions can be changed for determining the end positions of the rock shaft 40, and thus of the member 23.

The support 10 also receives a housing 50 to which air may be supplied under pressure through a pipe 51, and which has a nozzle 52 with its orifice adjacent the rim of the balance wheel BW. As shown in Figure 3, this housing 50 has a slide valve 151 movable therein by a spring 153 and by the armature 154 of an electromagnetic coil 111 connected to conductors 110 and 112. The valve 151 has the groove 152 which, upon energization of the coil 111, is brought into alignment with the ports of the supply line 51 and the nozzle 52, so that a puff of air is then blown through the nozzle under controlled conditions, as described hereinafter.

As conventionally shown in the circuit diagram portions of Figure 1, the photoelectric cell PE is so connected that upon illumination thereof, current will flow through an amplifier 60 for supplying several control devices, the connection of the cell PE and the number of stages in the amplifier 60 being arranged to provide positive voltage with increasing light, in the illustrated form.

For simplicity in the diagram, the cathodes of the various tubes are conventionalized as having heaters adjacent thereto, and an expert in the art will understand that any appropriate means may be employed for exciting the cathodes.

The amplifier 60 is connected to the counting circuits and devices, which include a potentiometer 61 and two electron tubes 65, 66 of the gas-conduction or Thyratron type. The cathodes of the two tubes are connected by a resistor 67, and the cathode of tube 66 is connected through a resistor 68 to a conductor 69 which may be regarded as a ground or reference-potential conductor. The grid of the tube 65 is connected to the potentiometer 61 through a condenser 72, and to the conductor 69 through a grid return resistor 70. The tube 66 likewise has a resistor 74 in its grid return circuit, and is connected through a condenser 72a with the potentiometer 61. The tube 66 has its anode connected through appropriate dropping resistors 79a, 79b to a conductor 75 which leads to the positive terminal of a steady source A of plate current. The anode of tube 65 is connected by conductor 76 to a contact 2 of the starting relay SR, with a return from the corresponding relay switch blade 1 by conductor 77 and an appropriate resistor 78a to the resistor 79b. Condensers 78, 79 are connected between the anodes of the respective tubes 65, 66 and the reference-potential conductor 69, so that they are in effect connected in series between the tube anodes, and also provide in association with the individually corresponding plate resistors 78a, 79a a pair of control devices for effecting the alternate action of the tubes 65, 66 so that these tubes alternately load and fire for the successive impulses from the photo cell PE.

From the cathode of tube 66, a conductor 80 with a series condenser 80a and control resistor 80b therein leads to the grid of a third electron tube 81, likewise of gas conduction type; a branched grid return conductor including a resistance 82 and a biasing source 82a leads to the reference-potential conductor 69 for controlling the grid charge in this tube to hold the tube normally in nonconductive condition. The anode of tube 81 is connected through resistor 83 with the source A. The cathode of the tube 81 is connected through a resistor 86 to the reference-potential conductor 69 and thus to the steady source A, to provide a positive impulse to the grid of tube 105, when tube 81 conducts. A condenser 89 is connected between the negative end of resistor 86 and the anode of the tube and, in association with the resistor 83, provides an RC network as a timing device for controlling the tube 81, which is quickly discharged upon receiving a sufficiently high positive impulse but requires a predetermined time of recharging before it can again respond by discharging. This time is adjusted to be greater than the time elapsing between points $b$ and $f$ (Figures 5 and 6), and will be described more in detail hereinafter. The source A maintains steady voltages on tubes 65, 66 and 81, and the output voltage from tube 66 is very constant while it is passing current; and hence it will activate tube 81 only when the plate voltage of this tube has reached a certain value by this recharging of the RC network, and thus the tube 81 will be maintained inoperative until the normal time interval from $b$ to $f$ has been exceeded.

The time necessary for condenser 89 to recharge is determined by the value of condenser 89 (for example, 0.5 microfarad) and the series resistor 83 (for example, 400,000 ohms) with a selected supply voltage (for example, 300 volts).

The output of tube 81 may be connected for indicating the timing impulses, as set forth in my copending application Serial No. 439,128 filed April 15, 1942.

In order to control the timing and supply of air at the device 50, the conductor 90 is connected through a resistor 109 with the control grid of a four-electrode gas discharge tube 105; and a control grid return for this tube is provided through resistor 108 and the biasing source 108a to the conductor 69. The anode of tube 105 is connected by a conductor 110 with a solenoid winding 111 located within the housing 50, and a return conductor 112 from the winding 111 is connected through a resistor 112a with conductor 75, and thus to the source A. A condenser 112b connects conductor 112 to the reference-potential conductor 69. The tube 105 is thus controlled from the tube 81 to effect production of the air blasts or puffs from the device 50 at a properly phased instant.

The amplifier 60 delivers current by conductor 95 to a potentiometer 92 with a return by the conductor 69. The potentiometer 92 affords a control on the amplitude of response at the tube 105 and thus of the energy being delivered by the air blasts or puffs, by the means set out herein. From the potentiometer 92, a voltage is applied to the control grid of an amplifier tube 93. The corresponding cathode is connected by a resistor 94 and a by-pass condenser 94a with the conductor 69. The corresponding anode is connected through a resistor 96 with the positive voltage conductor 75, and a voltage may also be applied from this anode through a condenser 96a, which may be of the order of 0.02 microfarad and which affords a low impedance to high frequency currents and a high impedance to low frequency currents, to the control grid of tube 93a, a grid return circuit being provided through a choke coil 97 which may be of the order of 22 henries, thus affording a low impedance path to direct current but a high impedance path to alternating current and increasing in impedance with increase of frequency. The cathode of tube 93a is connected through a resistor 94b and a by-pass condenser 94c with the conductor 69. The anode of tube 93a is connected to the primary 98 of a transformer and thence to the conductor 75. The tubes 93, 93a thus provide two stages of amplification for the current impulse derived from the potentiometer 92 with the inclusion of frequency-discriminating elements. The secondary winding 99 of this transformer has its terminals connected to the two anodes of the dual rectifier tube 100. The cathode of the tube 100 is connected through a resistor 101 and a by-pass condenser 102 with the conductor 69, and also is connected through a higher-valued resistor 103 with the conductor 75. From the mid-point of the secondary winding 99 of the transformer, a conductor 104 leads through series resistance 113, 114 to the screen or anode grid of the tube 105. The common connection of resistors 113, 114 is connected to a microammeter 115, which in turn is connected through a resistor 116 and a biasing battery 117 with the conductor 69. The terminals of resistor 114 are by-passed to conductor 69 by condensers 118.

A capacitance has the characteristic of offering high impedance to low frequencies and an inductance that of offering low impedance to low frequencies. Thus, with a low frequency most of the available voltage appears across the .02 microfarad condenser 96a and the grid of the right-hand section of tube 93 is substantially at the potential of conductor 69. As the frequency increases, the impedance of the .02 microfarad condenser 96a decreases and that of the inductance 97 increases so that a higher voltage appears across the grid circuit of the tube 93a. The values of the condenser and inductance are so selected that, over the working frequency range (60 to 250 cycles per second) with constant voltage applied to the network, more voltage will drive the tube 93a at high frequencies than at low frequencies. Thus, the input to the full wave rectifier tube 100 increases with increased frequencies and the controlling voltage delivered by this tube 100 to the screen grid of the tube 105 is a function of the amplitude of oscillation, as set out below.

The normal or proper period of the balance does not vary through wide limits. For example, if the period varied plus or minus 72 minutes per day, this would only be a variation of 5 percent. The period can therefore be considered essentially constant within such limits. It is desired to maintain the motion swing of the balance at 1½ turns which is approximately that utilized by the balance in a watch. Regardless of whether a balance swings 1½ turns, 1 turn, or 2 turns (overbank condition), the overall time taken for a complete cycle is approximately the same within very close limits, whereas the change in amplitude of motion may vary 33 percent (1½ to 2 turns). Thus, in order to swing through greater angular distance in the same time, the angular rate must increase. Conversely, decreased motion will cause a decreased angular rate. Since the light spot covers a fixed angle, preferably made equal to the spoke width for the style of wheel being tested, the time required to scan this spot is less for high amplitudes and greater for low amplitudes. The time required for any one impulse, due to the spoke intercepting the light, depends largely on the total swing of the balance, and in fact, when the wheel is at correct time, the impulse time varies inversely with the motion. Considering the "basic frequency of each impulse" as the reciprocal of the impulse time, this frequency thus varies directly with motion. With the frequency selective network already explained, voltage input to the rectifier tube 100 is greater for high amplitudes than for low amplitudes. The output of the rectifier 100 is therefore also greater for high amplitudes, as output depends on input. The network of resistors 101, 103 in the cathode circuit of the tube 100 provides a bias which must be exceeded in order for the tube 100 to rectify. The connection from the amplifier 69 through conductor 95 and the associated parts thus serves to provide a direct current voltage which is essentially proportioned to the amplitude of movement of the balance wheel, as will be more fully described hereinafter, and has the effect of normally maintaining the screen or anode grid of tube 105 at such a voltage level as to hold this tube ready for conduction at the properly phased instant determined by the control from the tube 81; but this voltage responds to an increase of amplitude of movement until ultimately the screen grid of tube 105 is held at a voltage level such that the tube cannot conduct even at the instants when the tube 81 delivers the regular phased impulses to the control grid. The microammeter 115 therefore also indicates a value corresponding to the amplitude of the current impulses as rectified by tube 100: and thus indicates the electrical value of the impulses generated at the photoelectric cell PE, and hence its readings represent the prevailing amplitude of movement of the balance during its oscillations.

A starter relay SR has the energizing coil 121 and three contact blades. In the de-energized condition of the coil 121, the contact blade 122 normally closes a circuit between terminals 1, 2 for the conductors 76, 77. The contact blade 123 normally closes a circuit between contacts 3, 4. The contact blade 121a normally opens a circuit between contacts 5, 6.

A control relay CR has an energizing coil 125 for moving the normally closed contact blade 126 and thereby opening a circuit between terminals 7, 8.

When the crank arm 42 is in the position shown in Figures 1 and 1a, contact 45 is engaged with contact 47, corresponding to the "vibrate" position. In this condition, current is taken from the steady source A, and passes through coil 125 of the control relay CR and thence to contact 47, through contact 45, and back through the conductor 69 to the source A. When the crank arm 42 is moved to the opposite position, so that contact 45 is engaged with contact 46 in the "wind" position, current can flow to terminal 4 of the starter relay SR, through the switch blade 123 to terminal 3, and thence by conductor 128 to the winding solenoid 30 which controls the plunger 27, with a return by conductor 129 to conductor 69.

The coil 121 of relay SR is connected by conductor 130 to terminal 7 of the blade 126 of control relay CR; and terminal 8 of relay CR is connected to conductor 75, so that energizing current may flow from the source A to the coil 121 and thus hold the control relay SR closed as long as the control relay CR is de-energized and contact 45 is engaged with contact 46. Further, a maintaining circuit is established by blade 121a between contacts 5, 6 when the relay SR has been energized, so that the contact 45 can be separated from contact 46 without de-energizing relay SR; but this maintaining circuit also is controlled by relay CR, so that energization of the relay CR effects de-energization of the relay SR.

Before describing the operation of the parts, it may be pointed out that the path of the light beam LB (Figures 1 and 4) is fixed, and it is preferable so to adjust the condenser lenses and diaphragm structures 33, 34 that the transverse dimension of this beam corresponds to the width of the spokes of the balance wheel BW at the point of interception, as this gives an optimum accuracy and amplitude of response. Each time a spoke of the balance wheel BW intercepts the light beam LB, the photoelectric cell PE is shadowed. Thus, if the balance wheel BW, which is illustrated as having the usual two diametrically opposed spokes, is rocked through an arc of less than 180 degrees in either direction from a neutral axis NA (Figure 4), only the lower spoke intercepts the beam, and there is one obscuring effect at each stroke, or two for a complete cycle of movement for the balance wheel BW. If the balance wheel is rocking in each direction through an arc greater than 180 degrees and less than 360 degrees, then both spokes intercept the beam at 180 degree intervals of movement for a total of six obscuring effects per cycle. Since the balance wheel BW is moving fastest when it crosses the neutral axis at the mid-point of each oscillatory stroke, the shadow cast at this event is briefer in duration than that which is cast by the other spoke at 180 degrees displacement before and after the said interception at maximum speed.

In current practice with watch escapements, the balance swings through an arc greater than 180 degrees and less than 360 degrees in each direction from the neutral axis. Since the rate of the oscillatory system may vary slightly when the balance swings through angles less than those employed in actual practice, it is desirable to determine the rate at substantially the same amplitude of oscillation as is performed by the balance while in service.

The successive interceptions may be represented diagrammatically as in Fig. 5, where a curve 160 represents the rocking movement of the balance wheel BW and is conventionally shown as sinusoidal, although it will be understood that departures from strict sinusoidal condition are not unusual, usually by change of the slopes representing the forward or "tick" stroke or the rearward or "tock" stroke relative to one another. For accurate maintenance of time by the balance wheel, it is only necessary that the time interval from cycle to cycle between successive moments at which the balance wheel operates to release the train in a "tick" movement or in a "tock" movement shall be constant, and the time spacing from the "tick" release to the "tock" release need not be the same as that from the "tock" release to the "tick" release. Since a preferred construction is to have the balance release the timing train at the moment of maximum velocity of the balance, this release normally occurs both for the "tick" and the "tock" movements substantially at the neutral axis NA.

If the movement of the balance wheel BW is followed along the curve 160 of Fig. 5, beginning with the balance wheel at a point 161 at which it has been displaced from the neutral axis NA through an angle greater than 270 degrees but less than 360 degrees, it will be noted that the balance wheel gradually picks up speed. A spoke (the upper spoke in Fig. 4 after the winding through 330 degrees for example) crosses the light beam LB during this acceleration at a point 180 degrees from the neutral axis and causes a first electric impulse a. The balance wheel continues its acceleration under the urgency of the hair spring and at the neutral axis, a second impulse b of much shorter duration is produced by the interception of the other spoke (the lower in Fig. 4). Thereafter, during this "tick" stroke, the balance wheel BW slows down as it is now engaged in winding the hair spring, so that when the upper spoke (of Figure 4) next passes the light beam LB, a longer impulse c is again produced at 180 degrees from the neutral axis. Ultimately, the balance wheel BW comes to a standstill at a maximum amplitude around 330 degrees, and then returns in the "tock" stroke. In a watch or like movement, the pressure from the timing train adds to the energy of the balance wheel system so that the frictional and other losses are substantially compensated during each cycle and stroke. In the present device, energy is supplied from the maintaining device 50 for a like purpose.

After leaving the point 162 of maximum amplitude at the end of the "tick" stroke, the balance wheel BW begins to move backward under the urgency of the power stored in the hair spring, and during the course of its acceleration, the upper spoke again intercepts the light beam LB at substantially 180 degrees from the neutral axis to give an impulse d of relatively long duration; and then, as the balance wheel continues to accelerate, the lower spoke intercepts the light beam LB at the neutral axis and at maximum velocity to provide a short impulse e. As before, the balance wheel BW now decelerates, and a final long impulse f in the "tock" stroke is given by the upper spoke at 180 degrees after the neutral axis; finally the balance wheel BW comes to a standstill at a maximum amplitude of movement represented by the point 163 at the end of the "tock" stroke; and a "tick" stroke begins the next cycle. These "tick" and "tock" strokes alternate, and each pair constitutes a cycle of movement of the balance.

It may further be pointed out in Figure 5 that the dotted-line curve 164 represents a movement of the balance wheel BW which is in synchronism with the movement represented by the curve 160, but in which the balance wheel is moving through a smaller amplitude or lesser angles (being only slightly greater than 180 degrees).

Figure 7:
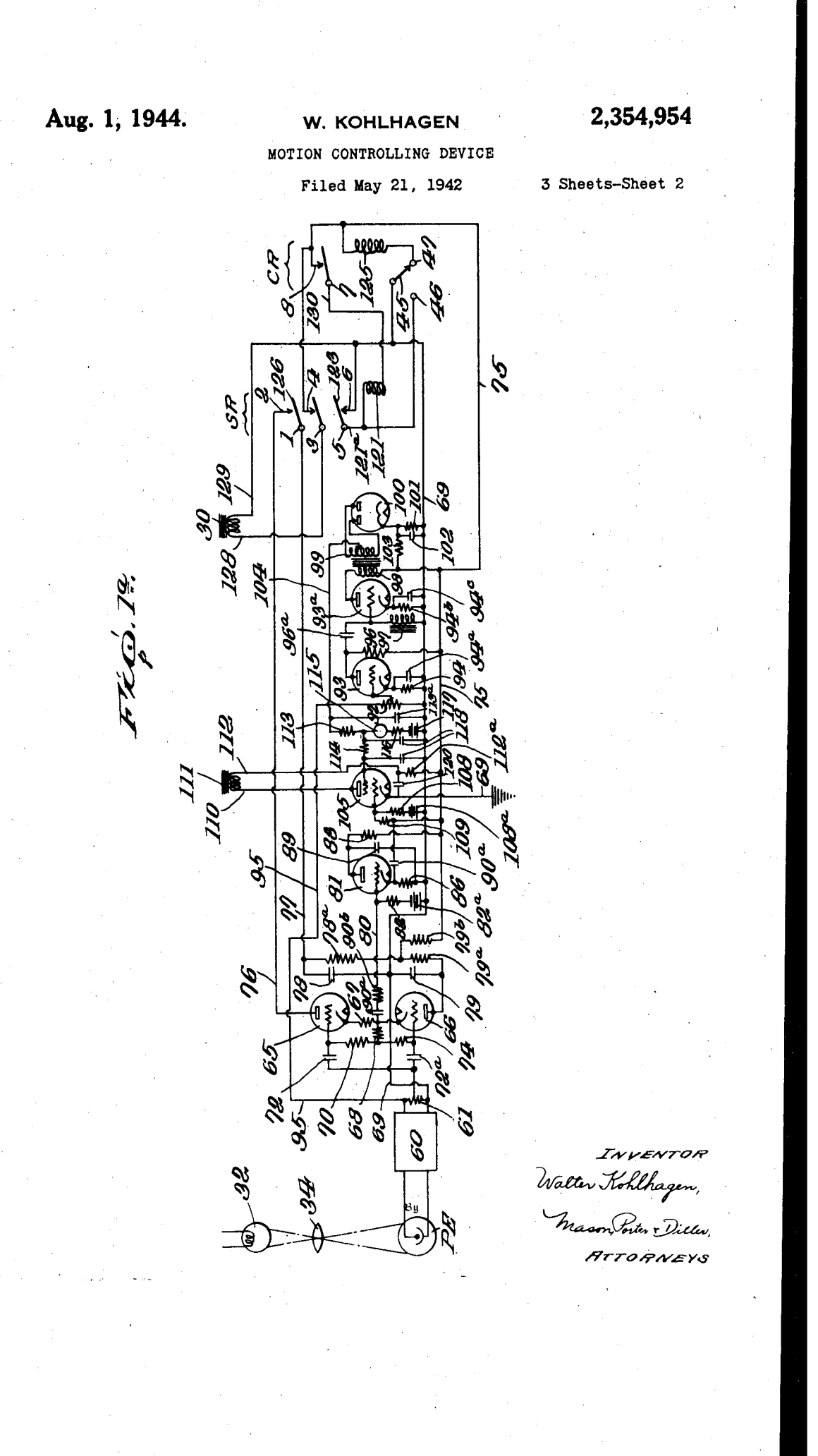

The slopes of the flanks of the curve 164 are much lower than those of the curve 160, and the upper spoke which intercepts the light beam LB at 180 degrees from the neutral axis is moving much more slowly than described above, so that the impulses $f'$ and $a'$ are much longer than the corresponding impulses $f$ and $a$ for the curve 160. Furthermore, in Figure 6, the groups of individual impulses have short durations corresponding to definite basic frequencies which are shorter for the $b$ impulses than for the $a$ or $c$ impulses, for example. However, when the amplitude of movement decreases, a greater proportion of the stroke is consumed in the impulses, so that the successive impulses (Figure 7) as shown by the curve 164 are individually of greater time duration and the individual $b$ impulses, for example, are longer and correspond to a lower basic frequency than before. The frequency-discriminating means 96a, 97 responds selectively under these varying conditions, so that the voltage from tube 100 is functionally related to the angular speed of movement of the balance and this represents the amplitude of movement of the regularly oscillating balance.

In operation, the crank handle 42 is initially in the "vibrate" position (as shown in Figure 1) i. e. with contact 45 engaged with contact 47. Power is supplied to the electrical circuits and to the lamp 32, and compressed air to the pipe 51. The knob 19 is withdrawn and a balance is inserted into the support 23, and then the knob 19 is released again, so that the balance is now supported for free rocking movement upon the members 16, 23. It will be noted that this is accomplished without any particular orientation of the balance. The hair spring HS is then clamped in the pincers 15 at a point of its length which is believed to represent the proper length of hairspring for accurate timing, the balance rotating about its axis as necessary for this adjustment. The disk 13 is then turned about its axis until one spoke of the balance wheel (the lower spoke in the illustrative form, Figure 4) intercepts the light beam LB while the balance wheel BW is at rest; this operation establishes the balance at the predetermined neutral axis NA (Figures 4 and 5). During these adjustments, the balance is turned slowly, and soon comes to rest in the desired initial position.

With the crank handle 42 and the sector 43 in the "vibrate" position for the insertion and orientation of the balance wheel, the contact 45 engages the contact 47; the control relay CR is energized and current also flows between terminals 3, 4 of the starter relay SR for energizing the winding solenoid 30 so that the plunger pin 27 is held in its right-hand or retracted position in Figures 1 and 2, and does not interfere with the manipulations of inserting and orienting the balance wheel. Current also can flow between terminals 1, 2 of the starter relay SR, so that the anode circuit of tube 65 is closed.

The operator now shifts the crank 42 in a clockwise direction in Figure 1. The sector rack 43 drives the pinion 25, and the disk 26 is turned counter-clockwise through an angle established by the spacing of contacts 46, 47 in this illustrative form. When the crank lever 42 is moved, the winding pin 27 is turned (in the direction of the arrow in Figure 3) through an angle between 360 and 450 degrees. In this movement, the retracted winding pin 27 provides a movable detent which moves through substantially 90 degrees (less the radius of the pin 27 and one-half the width of the spoke) before it encounters a spoke of the balance, and then moves through a further distance of 270 degrees before the lever 42 reaches its end stop, corresponding to a normal total movement of the winding pin 27 of about 360 degrees from its own initial or zero position.

This movement of the disk 26 is preferably terminated when the plunger pin 27 is substantially midway between the spokes, that is, with its axis substantially in the horizontal plane through the balance wheel axis in this illustrative form. In this position, the plunger pin 27 can be released without danger of contacting a spoke. During this movement of the crank 42, the contact 45 leaves the contact 47 so that the control relay CR is de-energized. Its blade 126 is released and moves to the closed position so that current can now flow between the terminals 7, 8 for energizing the coil 121 of the starter relay SR. This closing circuit for the starter relay SR, however, is still held open between the contacts 45, 46, and the current continues to flow through the winding solenoid 30 and the plunger pin 27 is held retracted.

When the crank handle 42 has been brought to the "wind" position, contact 45 engages contact 46, so that the starter relay SR is energized. The circuit is closed between terminals 5, 6 and a maintaining circuit is established through the coil 121 so that the relay SR remains closed regardless of further movement of the crank 42, thus preventing false operations in the event of multiple partial movements by the crank 42 or of chatter at the contacts 45, 46. Furthermore, energization of relay SR opens the circuit through the winding solenoid 30 between the contacts 3, 4 so that the plunger pin 27 is released and moves forward to intersect the plane of the spokes, the plunger then being in the initial position KA in Figure 3, for example. The circuit through the terminals 1, 2 of relay SR is also opened so that the anode circuit of tube 65 is opened and tube 66 is energized; thus assuring that the tube 65 will be ready to be brought into conductive condition at the beginning of the actual timing movement of the balance wheel. Thus, the parts have now been prepared for the winding and release of the balance wheel.

The crank handle 42 is now moved back again into the "vibrate" position.

The separation of contacts 45, 46 does not disturb the circuits which have been set up, due to the maintaining circuit for starter relay SR which is closed across terminals 5, 6. The plunger pin 27 moves into contact with a spoke of the balance wheel BW and then pushes this spoke in front of it until the balance wheel BW has been turned and the hair spring has been mechanically strained or wound through an angle of, say, 330 degrees. At completion of this movement, the contact 45 again engages the contact 47 which provides a stop against further movement of the crank handle 42. These contacts 45, 47 again establish a circuit through the energizing coil 125 of control relay CR, and this relay opens its controlled circuit between terminals 7, 8, and terminates the maintained energization of the starter relay coil 121. As the armature contacts of starter relay SR move in responding to the de-energizing, the winding solenoid 30 is again energized and the plunger pin 27 is retracted so that the balance wheel is released and can begin its oscillation. Further, the anode circuit of tube 65 is closed between terminals 1, 2; and the maintaining circuit for relay SR is opened between terminals 5, 6.

As the balance oscillates, successive impulses are created by the momentary interceptions of light falling upon the photoelectric cell PE. At the first impulse (a in Figure 5), current flows and causes the firing of tube 65 and extinction of tube 66. As the balance has just left its wound position, this initial impulse is thus predetermined to occur shortly after the balance begins its movement. When a spoke of the balance wheel next intercepts the light beam, a second impulse (b) is delivered, which causes a firing tube 66, and this tube 66 in turn causes the firing of tube 81, and this in further course causes firing of the tube 105: and is accompanied by extinction of tube 65. When the third impulse (c) is created, the tube 65 is fired again, and tube 66 made quiescent, along with tubes 81 and 105.

The balance wheel now attains the end of its forward stroke, and reverses. At the fourth impulse (d), tube 66 is fired but as its plate circuit condenser 79 has been previously discharged and a sufficient time has not elapsed for recharging, it is not now able to effect firing of tubes 81 and 105: tube 65 is extinguished. At the fifth impulse (e), tube 65 is fired, and tube 66 is extinguished. At the sixth impulse (f), tube 66 is fired, and tube 65 is extinguished. The plate circuit of tube 66 has not yet been recharged so that this tube is still unable to fire tubes 81 and 105, and these tubes remain non-conductive. This completes a cycle of movement of the balance wheel, and the next series of impulses occur during the next cycle. At impulse a of this succeeding cycle, tube 65 is fired, and tube 66 is extinguished. At impulse b, tube 66 is fired, but the interval has now been such that its plate circuit condenser 79 has fully recharged, and hence tubes 81 and 105 are fired: tube 65 is extinguished.

Thus, only at the b impulse out of each cycle of six are tubes 81 and 105 fired; and the device is hence selective of impulses of the b type which are produced at the moment when the balance passes its neutral axis, being then moving at its maximum velocity in a "forward" direction or on the "tick" stroke in this illustrative example.

The alternate firing action of tubes 66 and 65 is a result of varying voltages obtained during transient conditions.

By the term "gas conduction tube" is meant herein an electron discharge tube usually having a gaseous content and by which a relatively negative voltage upon a grid will inhibit the effective passage of current at a predetermined voltage between cathode and anode, while the presence of a predetermined relatively more positive potential upon the grid will provoke the passage of current from cathode and anode, i. e., the firing of the tube; with a further characteristic that the established flow of current at such voltage between cathode and anode will continue substantially free from control by changes of grid potential, until the voltage between the cathode and anode has been so reduced below a certain critical value that the grid can again take charge and stop the flow. This action is obtained, for example, in the circuit shown for tubes 65 and 66 by distributing the voltages across the condensers, resistors and tubes so that the transients appearing across the common cathode resistor 68 provides the desired effect.

With tube 66 conducting, and the source A maintaining 300 volts between conductors 69, 75, 76 voltages during the steady state are so distributed that, for example, 45 volts appears across resistor 68, 15 across tube 66, and 60 volts across condenser 79 since this condenser is in parallel to the tube 66 and resistor 68. 92 volts appears across the anode resistor 79a, and 148 volts across the common anode resistor 79b. Condenser 78 charges up to 152 volts, as the entire 300 volts is applied to this condenser 78 except for the drop across resistor 79b. Not all of this appears across tube 65, however, as 45 volts appear on the cathode resistor 68 to reduce the voltage on tube 65 by that amount. The tube 65 remains non-conducting due to the biasing effect of resistor 68 until an impulse of sufficient amplitude from the input drives its grid positive. When this occurs, the tube 65 fires and passes current, and a transient condition obtains so that the minimum voltage for conduction in tube 66 is no longer present, and hence tube 66 becomes non-conducting and is extinguished. This is accomplished by maintaining constant the plate voltage supply to a conducting tube and its associated circuit elements, and increasing the voltage between the tube cathode and the reference-potential conductor 69, so that the effective voltage across the tube is lowered below that necessary for conduction.

During the preceding steady state, condenser 78 has been charged to 152 volts, and the remainder of 148 volts has appeared across tube 65. At the instant tube 65 begins to conduct, the current through resistor 68 increases above .004 amp. due to the condenser 78 discharging through tube 65, resistor 67 and resistor 68. The cathodes of both tubes 65, 66 are then raised in voltage in a positive direction. The anode of tube 66 cannot rise instantaneously in relative potential, however, due to the stabilizing effect of condenser 79, as a condenser cannot charge instantaneously. Thus momentarily the tube voltage is reduced sufficiently to cause it to extinguish and become non-conductive. The extinguishing action is further assisted by a voltage drop appearing across resistor 79b due to the current surge through tube 65, part of which comes from resistors 78a and 79b. It can be seen that if tubes 66 and 65 were conductive at the same time, approximately twice the normal current would flow through resistor 79b, thus causing a very large voltage drop thereon. Tube 66 is maintained non-conducting until steady conditions are again reached as the discharge of condenser 78 causes increased voltage to appear across resistor 68, which biases the tube since it is between the cathode and the reference-potential conductor 69.

The actions of tubes 66 and 65 are identical in that as each tube is caused to fire, the other tube is extinguished; the resistor 67 is included in the cathode circuit of tube 66 in order to reduce the transient voltage caused across resistor 68 while tube 65 is conducting. In this illustrative employment, the transients provided by tube 66 and appearing between the terminal of conductor 80 and the reference-potential conductor 69 are used to activate the further tube 81. Resistor 67 reduces the transient current flowing through tube 65, thus reducing the transient voltage on resistor 68 caused by that tube.

The operation of the air driving system for maintaining the amplitude of motion depends (a) on the phasing, under control of the tube 81, (b) on the amplitude of motion of the device being tested, under control of the rectifier tube 100. These effects are coordinated in the tube 105, which normally has a negative bias upon its control and screen grid elements which prevents its operation except as the control grid receives a positive impulse from the tube 81, and hence normally it causes a properly timed blast of air to be delivered for maintaining the balance motion. When the amplitude of this motion becomes higher than desired, the negative voltage delivered to the screen grid is increased, and the air is shut off. In the illustrated form the current normally flowing from the anode of the tube 105 at the properly phased instants causes the valve 151 to open and deliver an air puff representing a greater delivery of energy to the device than it loses during a cycle by reason of air resistance, friction, etc., so that in this preferred form of construction the amplitude of motion is being constantly increased so long as puffs are being delivered. When the amplitude of motion passes beyond a predetermined maximum, the voltage of the control circuit builds up, the tube 105 ceases to conduct even at the proper phase, and the air is shut off.

The operation of the circuits and devices for maintaining the balance in oscillation at substantially constant amplitude is controlled by the photoelectric cell, both on the basis of the timing of the balance, and also on the basis of the prevailing amplitude of strokes being presently performed by the balance. As the balance amplitude decreases each individual impulse becomes slightly longer, as each interception of the light beam lasts for a greater duration, and hence the effect upon the photoelectric cell is to cause a longer interruption of current flow, which through the action of amplifiers 60, 62 becomes a current impulse of the type shown in Figure 7, with the impulses corresponding to lower basic frequencies. Hence, by reason of this condition, the condenser 96a offers greater impedance to the passage of current while the choke coil or inductance 97 offers less impedance. A lesser part of the output voltage of tube 93 therefore appears across the choke coil 97 and a lower voltage is built up on the grid in the second stage 93a of the amplifier and less current passes therein, and hence the rectifier 100 receives less current, and a rectified current of lesser amplitude is delivered to microammeter 115 and to the screen grid of tube 105, so that this screen grid becomes less negative. The resistors 113, 116 and the condenser 113a form a resistance-capacity filter in which the current pulses from the rectifier 100 are filtered to provide a direct current voltage proportional to the input to this rectifier. This voltage is applied to the screen grid of the vacuum tube 105, which is of "gas conduction" type, and serves to prevent establishment of conduction therein when the balance amplitude exceeds a predetermined maximum desired level. The control grid and the screen grid of tube 105 interact to control the conduction which occurs in this tube. With a particular tube 105, which has been employed in practice of the invention, the use of a particular negative bias upon the screen grid required a positive impulse of approximately four volts to effect conduction, this impulse being provided by current from conduction in the vacuum tube 81 which only conducts at the points b of maximum velocity during the "tick" stroke, as already explained. The total voltage supplied to the screen grid of tube 105 consists of the component supplied by the biasing battery 117, and the component appearing across the resistor 116 and supplied by the rectifier 100.

The potentiometer 92 permits adjustment of the input to the rectifier 100 and is set at a value so that the voltage from the rectifier at a desirable high level of amplitude of balance motion, in coaction with the biasing battery component, holds the screen grid at a negative value just permitting conduction in the tube 105 when the positive impulse is provided at the control grid.

If the balance motion increases in amplitude beyond the desired point, an increased voltage will appear across the resistor 116 as a result of the tuning effects of condenser 96a and inductance 97, and the screen grid of tube 105 becomes more negative and prevents conduction in the tube 105, so that no current flows to the winding 111 of the air valve structure, and no air is delivered therethrough. If the balance motion again decreases, the voltage across resistor 116 decreases, and the screen grid of tube 105 becomes less negative so that a current impulse, flowing as the result of excitation of tube 81 at the proper instant, can cause the tube 105 to conduct current to energize the winding 111 and cause a blast of air to be momentarily directed against the balance, at a proper time and phase to restore the energy lost by friction, etc., and by which loss the balance motion has decreased in amplitude.

It will be noted that two conditions must be fulfilled before the air valve can be actuated. First, the control grid of tube 105 must receive a positive impulse from tube 81, which as explained above can only occur at the instant of maximum velocity and only during the "tick" stroke. Second, the screen grid of tube 105 must not be so highly negative that conduction is prevented, which can only occur when the balance is oscillating at an amplitude not exceeding a predetermined maximum level. Thus the tube 81 provides a control grid impulse at the proper time and phase, while the rectifier 100 provides a screen grid voltage that depends on whether or not the prevailing amplitude is such as to require delivery of additional energy to the balance. The air blast or puff provided at each energization of the air valve is regulated to have a slightly greater energy-delivering effect upon the balance than the energy-dissipating effects of the frictional losses, etc., thereof. The excess of energy thus delivered assures that the desired amplitude will be restored, and an automatic control is assured for maintaining an essentially constant amplitude as the arrangement automatically compensates for any changes in air pressure, the number of screws on the balance, and other uncertain factors which restrict the feasibility of employing a simple synchronous air blast for maintaining the balance movement.

The operation of the system can be stopped by moving the crank 42 to interrupt the circuit through contacts 45, 46, whereby the relay CR is de-energized. When contacts 45, 47 are closed, the relay SR is energized, and sets up its maintaining circuit between contacts 5, 6, and current flows through the plunger winding 30. Since the tubes 65, 66 are connected so that they alternately fire and extinguish, the interruption of the anode circuit of tube 65 prevents any further change in the status of these two tubes and tube 66 remains in conductive condition, and the control grid of tube 105 is held at a high relatively negative potential so that no current flows through the tube 105 and the solenoid 111 is not energized. The plunger 27 is permitted to return to its left-hand position between spokes of the balance wheel BW and interrupt a further oscillation of the balance.

Ultimately, the return movement of crank 42 causes the contact 45 to engage contact 47, thus mechanically establishing an initial angular position for the plunger 27, while leaving the balance wheel BW quiescent at its neutral axis NA, and also re-establishing the initial circuits so that the electrically connected parts are restored to their initial condition.

In the circuits shown in the figures, it will be noted that the resistors and condensers are shown conventionally at proper points for showing the entire action of the electron discharge tubes and for preventing the imposition of improper direct or straight current impulses by which improper energizations might be obtained as known by experts in the art. The proper sizes and electrical values of these in constructional employment form no part of the invention save and except as they constitute parts of the illustrative circuits for attaining the purposes stated.

It is obvious that the invention can be practiced in other ways than by the illustrated mechanical and electrical parts, within the scope of the appended claims.

I claim:

1. An apparatus for maintaining an oscillatory device in motion at its natural frequency, comprising means for delivering energy to the device, means for scanning the device itself in its motion and therewith effective for controlling said delivering means for procuring the delivery of energy at the proper phase relationship in the natural period of said device, and means responsive to the amplitude of the prevailing oscillations of the device for controlling said delivering means for procuring the delivery of energy only when the amplitude is below a predetermined value.

2. An apparatus for maintaining an oscillatory device in motion at its natural frequency, comprising means through which a blast of air may be directed against the device for imparting energy thereto, means responsive to the movement of the device itself for effecting delivery of air to said means at a proper phase relationship in the natural period of the device, and means responsive to the amplitude of the prevailing oscillations of the device for preventing the delivery of air through said means when the amplitude exceeds a predetermined value.

3. An apparatus for maintaining an oscillatory device in motion at its natural frequency, comprising a nozzle through which a blast of air may be directed against the device for imparting energy thereto, means including a valve for supplying air to said nozzle, photoelectric means for scanning the movement of said device itself, elements controlled by said photoelectric means for deriving impulses at proper phase relationship in the natural cycle of oscillation for causing said energy to augment the amplitude of oscillation, elements controlled by the photoelectric means for effecting a voltage change at a predetermined value of amplitude of oscillation of the device, and coordinating means responsive to said elements only when the voltage change and the phase relationship are concurrently operative and itself effective to produce actuation of the valve.

4. An apparatus for maintaining an oscillatory device in motion at substantially constant amplitude and at its own natural frequency, comprising a frame, rockable means for the frame for supporting the device, means for delivering energy to the device and including a control element, means responsive to the movement of the device for controlling the said element for procuring the delivery of energy only at a predetermined phase relationship in the natural cycle of oscillation thereof, means responsive to the amplitude of oscillatory movement of the device itself for controlling the said element for procuring the delivery of energy only when the prevailing amplitude of oscillation of the device is below a predetermined value, means for rocking said rockable means and for initially storing energy and for releasing the same to provoke the oscillatory movement of said device, and means coordinated with said releasing means for initiating the action of said movement responsive device whereby to assure accurate determination of said phase relationship.

5. An apparatus for maintaining an oscillatory device in motion at its natural frequency, comprising means for delivering energy to the device, means for scanning the movement of the device and thereby deriving groups of impulses in which the impulses are spaced apart a distance dependent upon the amplitude of movement, means for discriminating between impulses of a group, frequency responsive means actuated by the groups of impulses for coordinating with said discriminating means in effecting the actuation of said delivering means only at a predetermined phase relationship in the natural cycle of oscillation and when the prevailing amplitude of oscillation of the device is below a predetermined value.

6. An apparatus as in claim 5, in which the scanning means is actuated by the device itself to deliver said impulses as momentary electric currents, and the frequency responsive means includes an electron discharge tube having a control grid connected for receiving said currents through a condenser and connected through an inductance with the cathode of the tube, whereby the grid potential of said electron discharge tube varies with the spacing of the impulses in a group.

7. An apparatus for maintaining an oscillatory device in motion at its natural frequency, comprising a nozzle for directing a blast of air against the device, a valve for controlling the supply of air to said nozzle, photoelectric scanning means for deriving cyclic groups of current impulses in which the individual impulses correspond to the transit of predetermined parts of the device past a reference point, and in which the impulses are spaced apart within each group by distances dependent upon the prevailing amplitude of the oscillations, one of said impulses occurring at the maximum speed of movement of the device in one direction, a pair of elements controlled by said impulses and alternately responsive thereto, a third element and timing means associated therewith and connected to the said pair of elements whereby said third element is selectively energized only through one of said pair of elements and upon said one impulse during each cycle of oscillatory movement of the device, frequency-responsive means controlled by said impulses and effective to produce a controlling current of intensity dependent upon the spacing of said impulses in each group, and means coordinating said energized periods of said third element and said controlling current and effective for producing the opening and closing of said valve.

8. An apparatus for maintaining a device constantly in motion, comprising means capable of delivering to the device an amount of energy greater than that required for compensating losses, means for scanning the device in its motion and connected for controlling said delivering means for procuring the delivery of energy only at the proper phase relationship, and means responsive to the amplitude of the prevailing movement of the device for controlling said delivering means for preventing the delivery of energy in excess of such losses so long as the amplitude exceeds a predetermined level.

9. The method of maintaining an oscillatory device constantly in motion at substantially constant amplitude and at its natural frequency, comprising scanning the movement of the device at a plurality of angular positions during its cycle of movement, one of said positions being that at maximum velocity of the device in one direction, determining the prevailing amplitude of movement of the device, delivering pulses of energy to said device cyclically at phased instants determined by said scanning, each pulse being of amount greater than the energy losses of the device during a cycle so long as the amplitude has been determined as less than a predetermined level, and interrupting the delivery of energy in excess of such losses so long as the amplitude remains at said predetermined level.

10. An apparatus for maintaining an oscillatory device in motion of essentially constant amplitude and at its natural frequency, comprising means for delivering energy to the device, means for scanning the device itself in its motion and thereby determining the prevailing amplitude of the movement and the phase relationship of points occupied during the oscillations, and means responsive to said scanning means and effective for controlling said delivering means whereby to procure the delivery of energy to the device only at a selected phase relationship in the natural period of the device and only when the amplitude is below a predetermined value.

11. An apparatus for maintaining an oscillatory device in motion of essentially constant amplitude and at its natural frequency, comprising means for delivering energy to the device, means for scanning the device itself in its motion and thereby determining the prevailing amplitude of the movement and the phase relationship of points occupied during the oscillations, and means responsive to said scanning means and effective for controlling said delivering means whereby to procure the delivery of energy to the device only when the device is moving at substantially its maximum velocity during an oscillation and to procure the delivery of an amount of energy in excess of losses only when the amplitude is below a predetermined value.

12. An apparatus as in claim 5, in which scanning means is activated by the device to deliver said impulses as momentary electric currents, and the frequency responsive means includes an electron discharge tube having a control grid connected for receiving said currents through a condenser and also connected through an inductance with the cathode of the tube, whereby the grid potential of said electron discharge tube is determined by said currents and through the action of said condenser and inductance is caused to vary with the spacing of the impulses in a group, and means responsive to the anode current of the tube for controlling the said delivering means.

13. An apparatus as in claim 5, in which the frequency responsive means include an electron discharge tube having a control grid and connected for amplifying said current impulses and delivering the same for controlling the delivering means, and a condenser and inductance constituting a variable impedance device responsive to the spacing of the impulses in a group and connected to the control grid of the tube for varying the grid potential of the tube selectively according to the spacing whereby to control the amplitude of the output of the tube in accordance with said spacing.

WALTER KOHLHAGEN.